United States Patent
Jansen (10) Patent No.: US 7,471,396 B2
(45) Date of Patent: Dec. 30, 2008

(54) DUAL POLARIZATION INTERFEROMETERS FOR MEASURING OPPOSITE SIDES OF A WORKPIECE

(75) Inventor: Maarten Jansen, Best (NL)

(73) Assignee: Mitutoyo Corporation, Kawasaki-shi (JP)

( * ) Notice: Subject to any disclaimer, the term of this patent is extended or adjusted under 35 U.S.C. 154(b) by 129 days.

(21) Appl. No.: 11/727,109

(22) Filed: Mar. 23, 2007

(65) Prior Publication Data

US 2007/0229842 A1  Oct. 4, 2007

(30) Foreign Application Priority Data

Mar. 28, 2006  (JP) .............................. 2006-089265

(51) Int. Cl.
*G01B 9/02* (2006.01)
*G01B 11/06* (2006.01)

(52) U.S. Cl. ..................... 356/492; 356/503; 356/514

(58) Field of Classification Search ............. 356/485, 356/489, 492, 495, 503, 512, 514

See application file for complete search history.

(56) References Cited

U.S. PATENT DOCUMENTS 5,995,226 A * 11/1999 Abe et al. .................. 356/511
6,504,615 B1    1/2003 Abe et al.
6,710,883 B2 *  3/2004 Yoshizumi et al. ......... 356/492
6,822,745 B2 * 11/2004 De Groot et al. .......... 356/496
6,847,458 B2 *  1/2005 Freischlad et al. ......... 356/503
7,239,397 B2 *  7/2007 Badami et al. ............. 356/503
7,268,887 B2 *  9/2007 Kulawiec et al. .......... 356/496
7,426,039 B2 *  9/2008 Badami et al. ............. 356/503
2005/0128587 A1  6/2005 Suganuma

FOREIGN PATENT DOCUMENTS

EP    1 460 374 A2     9/2004
JP    A 8-035883       2/1996
JP    A 2001-033215    2/2001

* cited by examiner

*Primary Examiner*—Samuel A Turner
(74) *Attorney, Agent, or Firm*—Oliff & Berridge, PLC (57) ABSTRACT

An optical interferometer (100) includes a first optical interferometer (200) disposed on a front surface side of a workpiece (W) and a second optical interferometer (300) disposed on a rear surface side of the workpiece (W). The first optical interferometer (200) and the second optical interferometer (300) each include a light emitting section (210, 310), a wire grid (220, 320) and an interference fringe sensor (230, 330). Wire alignment directions of the wire grid (220) of the first optical interferometer (200) and the wire grid (320) of the second optical interferometer (300) are orthogonal to each other. When no workpiece (W) is set, the wire grid (220) of the first optical interferometer (200) reflects light from the second optical interferometer (300) to generate object light and the wire grid (320) of the second optical interferometer (300) reflects light from the first optical interferometer (200) to generate object light.

8 Claims, 10 Drawing Sheets

DUAL POLARIZATION INTERFEROMETERS FOR MEASURING OPPOSITE SIDES OF A WORKPIECE

BACKGROUND OF THE INVENTION

1. Field of the Invention

The present invention relates to an optical interferometer. Specifically, the present invention relates to an optical interferometer that measures change in thickness of a to-be-measured object.

2. Description of Related Art

As a device for measuring an irregularity of a to-be-inspected surface, an optical interferometer has been known (for example, Document: JP-A-H08-35883).

Figure 8:
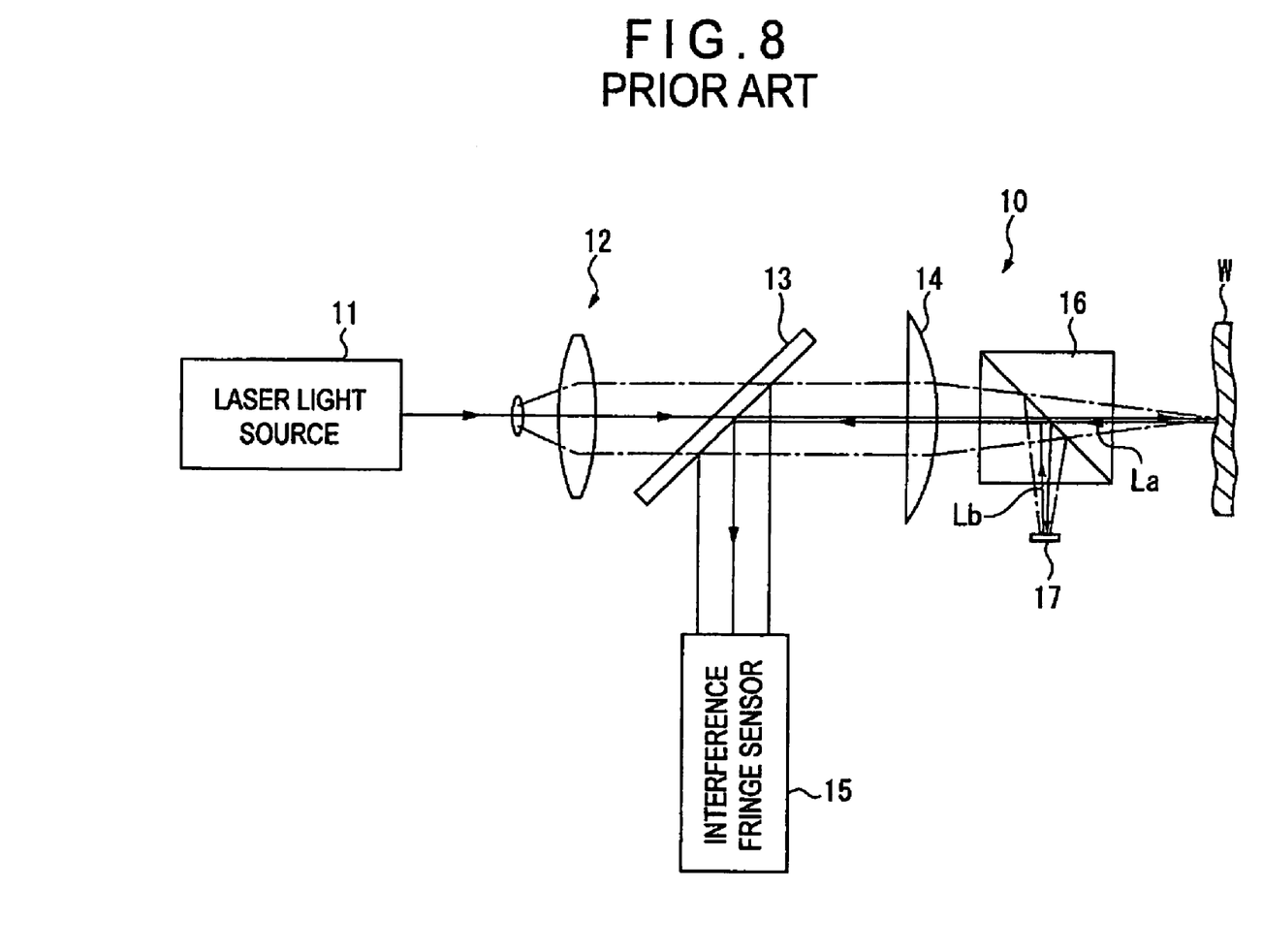
FIG. 8 shows a Michelson interferometer as a related-art optical interferometer.

FIG. 8 shows a Michelson interferometer 10.

In FIG. 8, light emitted from a light source 11 becomes a parallel light beam by a collimator lens system 12 and the parallel light is transmitted through a half mirror 13 and narrowed by a lens 14 disposed between the half mirror 13 and a workpiece W to be irradiated on the workpiece W. The light irradiated on the workpiece W is reflected by the workpiece W to be object light La. The object light La is reflected by the half mirror 13 to be incident on an interference fringe sensor. Between the lens 14 and the workpiece W, a beam splitter 16 and a reference mirror 17 are disposed. Out of the light having been transmitted through the lens 14, light transmitted through the beam splitter 16 is irradiated on the workpiece W and becomes the object light La, while light reflected by the beam splitter 16 is incident on the reference mirror 17 and reflected by the reference mirror 17 to be reference light Lb.

The reference light Lb is reflected by the beam splitter 16 again to be incident on an interference fringe sensor 15 via the half mirror 13. The interference fringe sensor 15 acquires interference fringes generated in interference between the object light La and the reference light Lb by capturing the interference fringes with a CCD camera (not shown) and the like. By analyzing gaps between the interference fringes, irregularities of a surface of the workpiece W can be obtained.

Where the irregularities of the surface of the workpiece W can be thus obtained using the optical interferometer 10, there are demands for knowing change in thickness of the workpiece W such as change in thickness of a semiconductor wafer. To know change in thickness of the workpiece W, one way is measuring a front surface of the workpiece W and then a rear surface of the workpiece W with the optical interferometer 10 shown in FIG. 8. Specifically, firstly the front surface of the workpiece is measured with the optical interferometer 10 shown in FIG. 8. Then, the workpiece W is turned over and irregularities of the rear surface of the workpiece is measured. By combining profile data of the front surface and the rear surface of the workpiece W, change in thickness of the workpiece W can be known.

By turning the workpiece W over such that a front surface Sa and a rear surface Sb of the workpiece can be measured, each irregularity data of the front surface Sa and the rear surface Sb can be obtained.

However, change in thickness of the workpiece W cannot be obtained if a point of front surface data Da is not matched with a point of rear surface data Db when combining the measured data. Specifically, even when the front surface data Da and the rear surface data Db are obtained as shown in FIG. 9, if coaxially corresponding points of the front surface data Da and the rear surface data Db cannot be identified, change in thickness of the workpiece W cannot be obtained.

Figure 9:
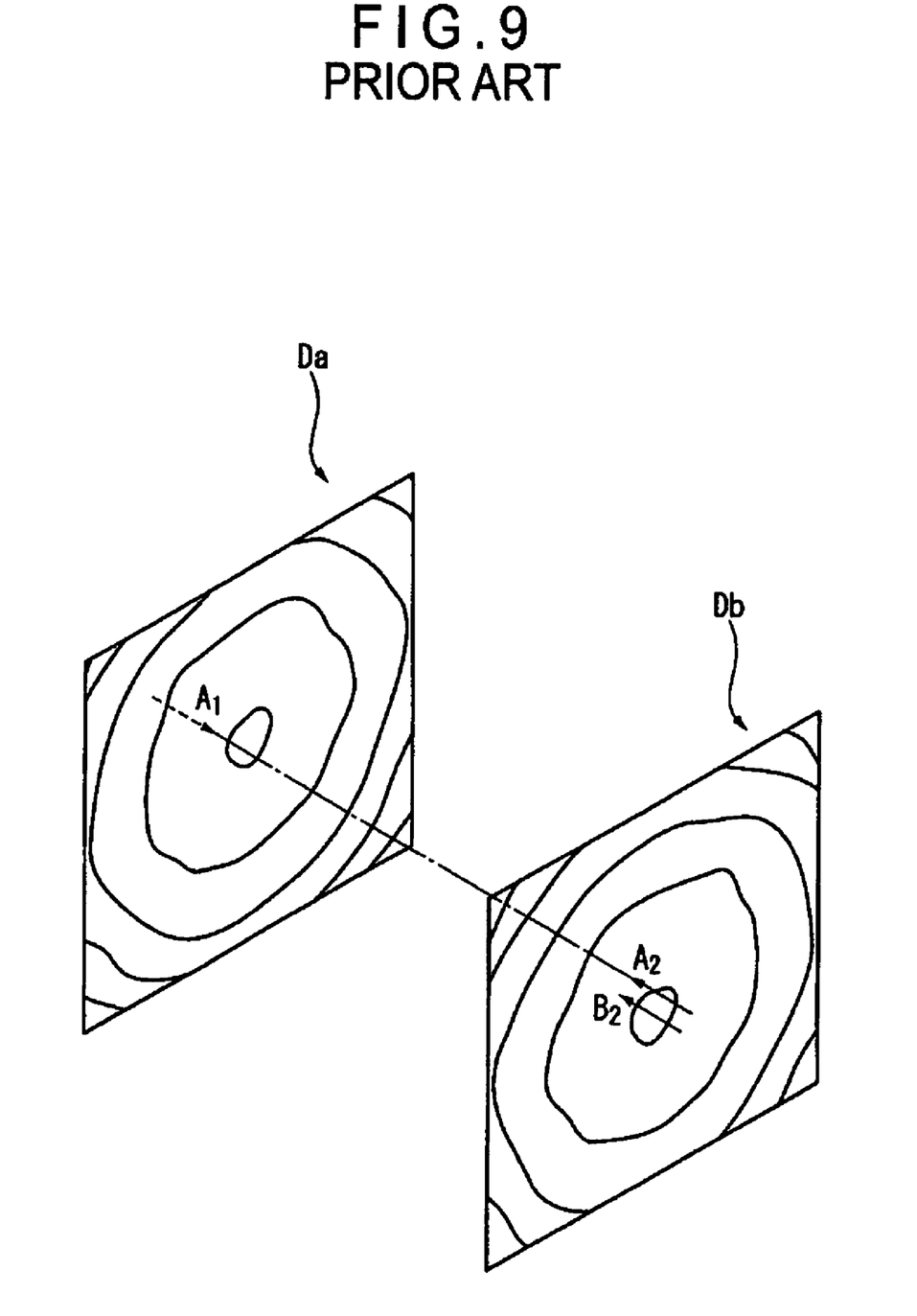
FIG. 9 shows how to match front surface data with rear surface data of a workpiece.

FIG. 9 shows a point A1 of the front surface data and a point A2 of the rear surface data, the point A2 being coaxial to the point A1. By matching the front surface data Da of the point A1 with the rear surface data Db of the point A2, data corresponding to the thickness of the workpiece W can be obtained. Thus, by matching the front surface data Da and the rear surface data Db of coaxial points, change in thickness of the workpiece W can be obtained.

However, when a coaxial point corresponding to the point A1 cannot be accurately identified and a point B2 that is displaced off the axis is matched with the point A1, change in thickness of the workpiece W cannot be obtained.

Figure 10:
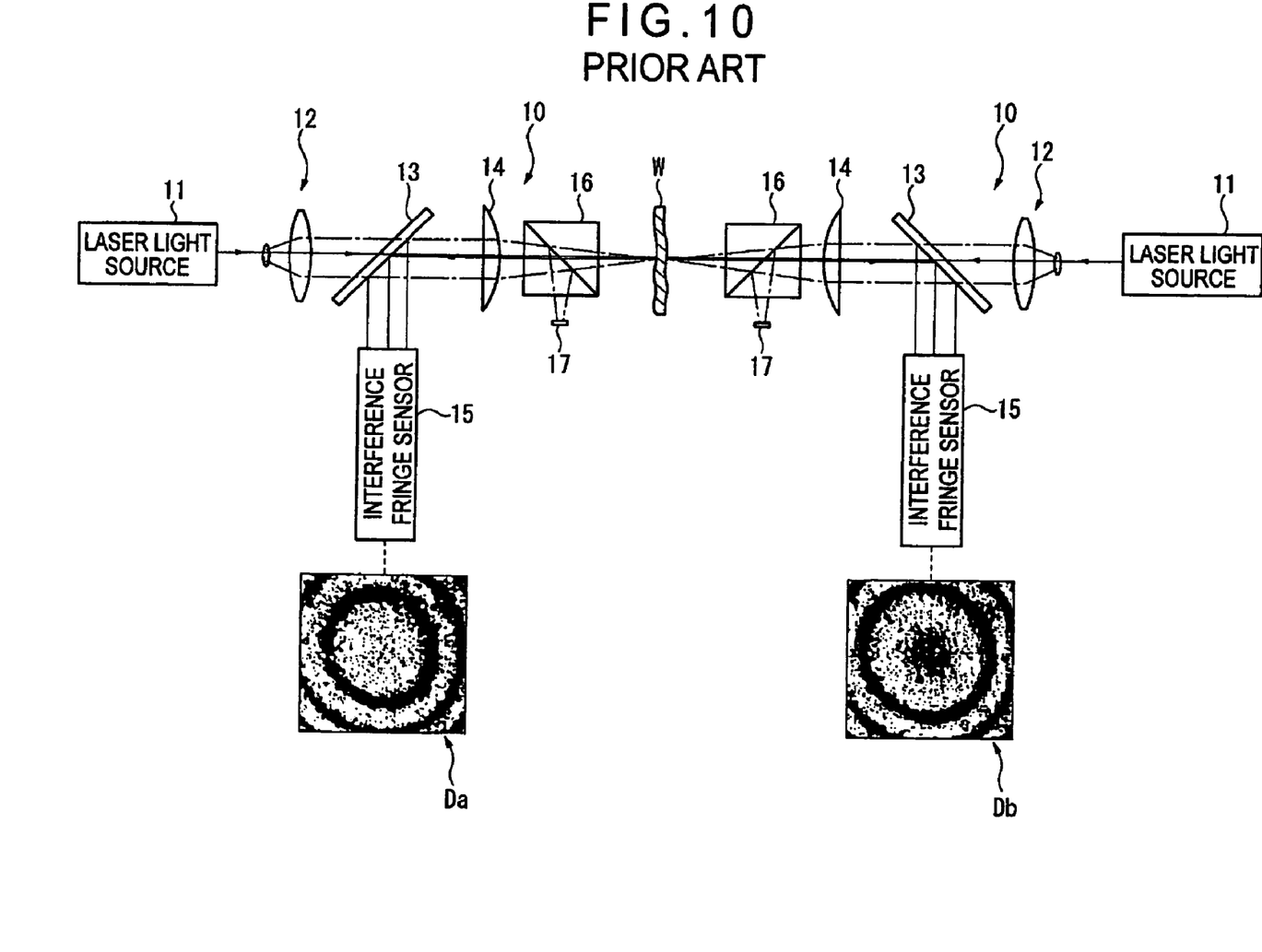
FIG. 10 shows an arrangement in which the relater-art optical interferometers are disposed on a front surface side and a rear surface side of the workpiece.

As another way, as shown in FIG. 10, two of the optical interferometer 10 can be respectively disposed on a front surface side and a rear surface side of the workpiece W with the workpiece W interposed. An optical flat (not shown) of which coaxial points of a front surface and a rear surface are identified in advance may be prepared. Before measuring the workpiece W, by measuring both of the front surface and the rear surface of the optical flat in advance, the corresponding points of the front surface side data Da and the rear surface side data Db can be identified.

However, it is difficult to prepare an optical flat of which front and rear surfaces are highly accurately flat without waviness and of which corresponding points of the front and rear surfaces are highly accurately identified.

Accordingly, even if the two optical interferometers 10 are disposed with the workpiece W interposed, it is difficult to obtain change in thickness of the workpiece W by matching the front surface data Da and the rear surface data Db coaxially.

The optical interferometer 10 on the front surface side and the optical interferometer 10 on the rear surface side each have the reference mirror 17.

Note that irregularity change obtained by the interference fringes is difference in irregularity and inclination of the reference mirror 17 and the surface of the workpiece.

Hence, when an irregularity and an inclination of the reference mirror 17 on the front surface side of the optical interferometer 10 differs from those of the reference mirror 17 on the rear surface side of the optical interferometer 10, even if the front surface data Da and the rear surface data Db are combined, a thus obtained value includes difference in irregularity and inclination between the reference mirrors 17 in addition to change in thickness of the workpiece W. In other words, it is not possible to obtain only change in thickness of the workpiece W.

Although it is possible to prepare the optical flat and obtain irregularity and inclination of the reference mirrors 17 in advance, it is difficult to prepare a highly accurate optical flat as described above.

Due to the above-stated problems, the demands for obtaining change in thickness of the workpiece W have not been met.

SUMMARY OF THE INVENTION

An object of the present invention is to provide an optical interferometer that obtains change in thickness of a workpiece.

An optical interferometer that measures change in thickness of a workpiece according to an aspect of the invention includes: a first optical interferometer disposed on a front surface side of the workpiece; and a second optical interferometer disposed on a rear surface side of the workpiece. The first optical interferometer and the second optical interferometer each include: a light emitting section; a polarization separator disposed between the light emitting section and the workpiece, the polarization separator having a reference surface, the polarization separator arranged such that a polarization direction of reference light that is reflected light reflected by the reference surface is orthogonal to a polarization direction of object light that is reflected light reflected by the workpiece; and an interference fringe sensor that acquires an interference fringe generated by interference between the reference light and the object light. The polarization separator of the first optical interferometer and the polarization separator of the second optical interferometer are disposed such that directions of polarization axes thereof are not in parallel to each other. When the workpiece is not set, the reference surface of the polarization separator of the first optical interferometer reflects light from the second optical interferometer to generate object light; and the reference surface of the polarization separator of the second optical interferometer reflects light from the first optical interferometer to generate object light.

In the arrangement, when the workpiece is set, the first optical interferometer acquires an interference fringe representing a profile of the workpiece front surface and the second optical interferometer acquires an interference fringe representing a profile of the workpiece rear surface.

Firstly, light emitted from the light emitting section is incident on the polarization separator. A portion of the light incident on the polarization separator is reflected by the reference surface of the polarization separator to be the reference light. The remaining of the light incident on the polarization separator is incident on the workpiece from the polarization separator and then is reflected by the workpiece to be the object light. Herein, since the polarization directions of the reference light and the object light are orthogonal to each other, both light become no-interference light that does not interfere with each other.

The reference light and the object light are incident on the interference fringe sensor. By causing interference between the reference light and the object light by transmitting the reference light and the object light through the polarizer, the interference fringe sensor can acquire the interference fringe. Thus, the first optical interferometer acquires the interference fringe representing a profile of the workpiece front surface and the second optical interferometer acquires the interference fringe representing a profile of the workpiece rear surface.

Next, a state in which no workpiece is set will be described.

When no workpiece is provided, the light from the first optical interferometer can reach the second optical interferometer owing to the nonexistence of the workpiece. A portion of the light incident on the polarization separator of the first optical interferometer is reflected by the reference surface to be the reference light, which is the same as the case in which the workpiece is set In contrast, light to be irradiated on the workpiece out of the light incident on the polarization separator of the first optical interferometer reaches the second optical interferometer. This light is reflected by the reference surface of the polarization separator of the second optical interferometer to be returned to the first optical interferometer.

The light that is returned from the second optical interferometer to the first optical interferometer is incident on the interference fringe sensor as the object light. Then, the first optical interferometer acquires an interference fringe generated by the interference between the object light and the reference light. In the second optical interferometer, since no workpiece is provided, the light from the second optical interferometer reaches the first optical interferometer, and an interference fringe generated by interference between the object light from the reference surface of the polarization separator of the first optical interferometer and the reference light from the reference surface of the polarization separator of the second optical interferometer can be obtained. Accordingly, when no workpiece W is set, both of the first optical interferometer and the second optical interferometer acquire the interference fringes generated by interference of the reflected light from the reference surfaces of the two polarization separators. Thus, when no workpiece is set, the interference fringes acquired by the first and second optical interferometers are the same.

According to the aspect of the invention, change in thickness of the workpiece can be obtained by matching coaxially corresponding points and combining the workpiece front surface data with the workpiece rear surface data.

Where the workpiece front surface data is obtained by the first optical interferometer and the workpiece rear surface data is obtained by the second optical interferometer, in order to obtain change in thickness of the workpiece by combining the workpiece front surface data with the workpiece rear surface data, coaxial corresponding points need to be matched between the workpiece front surface data and the workpiece rear surface data. It is because change in thickness of the workpiece cannot be accurately obtained if the data is combined with the front surface and the rear surface displaced.

However, according to the aspect of the invention, when no workpiece is set, the interference fringes acquired by the first optical interferometer and the second optical interferometer are the same, coaxial points on the data can be matched by matching common points on the data acquired by the first and second optical interferometers. For example, when positions of the interference fringe sensors of the first and second optical interferometers are displaced from each other, the interference fringes are displaced from each other on capturing screens of the first and second optical interferometers even when the interference fringes are the same. However, since the same interference fringes have been captured, pixel relationship of coaxially corresponding points can be obtained on the capturing screens of the first and second optical interferometers.

Firstly the pixel relationship in the capturing screens of the first and second optical interferometers is obtained. Then, a workpiece is set to acquire the workpiece front surface data and the workpiece rear surface data by the first and second optical interferometers. By combining the workpiece front surface data and the workpiece rear surface data in consideration with the relationship of the already obtained coaxially corresponding points, change in thickness of the workpiece can be obtained.

According to the aspect of the invention, change in thickness of the workpiece W can be highly accurately obtained without regard to difference in irregularities between the reference surface of the first optical interferometer and the reference surface of the second optical interferometer. When the workpiece front surface data is acquired by the first optical interferometer with the workpiece set, the interference fringe is a fringe based on change in gap between the reference surface and the workpiece front surface of the second optical interferometer. Similarly, when the workpiece rear surface data is acquired by the second optical interferometer with the workpiece set, the interference fringe is a fringe based on change in gap between the reference surface and the workpiece rear surface of the first optical interferometer.

Hence, when irregularities of the reference mirror of the first optical interferometer are different from those of the reference mirror of the second optical interferometer, the value obtained by combining the front surface data and the rear surface data contains the difference in irregularities between the two reference mirrors of the first and second optical interferometers. Thus, change in thickness of the workpiece itself cannot be obtained.

According to the aspect of the invention, when no workpiece is set, the interference fringes can be obtained, the interference fringes generated by interference between the reflected light reflected by the reference surface of the first optical interferometer and the reflected light reflected by the reference surface of the second optical interferometer. Hence, the difference in irregularity of the two reference surfaces can be obtained by the interference fringes acquired without the workpiece set Hence, by subtracting the difference in irregularity between the two reference surfaces workpiece after combining the workpiece front surface data and the workpiece rear surface data, change in thickness of the workpiece can be highly accurately obtained.

In the optical interferometer according to the aspect of the invention, the polarization separators each may be a wire grid polarizer that has a plurality of wires aligned in parallel to each other, the polarization separators reflecting a component that is parallel to the plurality of wires and transmitting a component that is orthogonal to the plurality of wires. A direction in which the plurality of wires are aligned of the wire grid polarizer of the first optical interferometer may not be parallel to a direction in which the plurality of wires are aligned of the wire grid polarizer of the second optical interferometer.

In the arrangement, a state in which the workpiece is set will be described.

Light emitted from the light emitting section is incident on the wire grid. A component parallel to the wires out of the light incident on the wire grid is reflected by the wire grid. The reflective surface of the wire grid is the reference surface, the light reflected by the reference surface is the reference light. A component vertical to the wires out of the light incident on the wire grid is transmitted through the wire grid to be incident on the workpiece. The light is reflected by the workpiece to be the object light.

Since the polarization directions of the reference light and the object light are orthogonal to each other, the light is no-interference light beams that do not interfere with each other. In the interference fringe sensor acquires the interference fringes generated by interference between the reference light and the object light.

Next, a state in which no workpiece is set will be described.

A component parallel to the wires out of the light incident on the wire grid from the light emitting section is reflected as the reference light, which is the same as the state in which the workpiece is set. A component vertical to the wires out of the light incident on the wire grid from the light emitting section is transmitted by the wire grid. The light transmitted through the wire grid reaches the wire grid on the opposite side owing to the nonexistence of the workpiece.

Note that the directions in which the wires of the wire grids of the first and second optical interferometers are disposed are not parallel to each other.

If the directions of the wires of the first and second optical interferometers are parallel, the light transmitted through the first optical interferometer can be transmitted through the wire grid of the second optical interferometer.

In contrast, according to the aspect of the invention, since the directions in which the wires of the wire girds of the first and second optical interferometers are not parallel to each other, when the light transmitted through the wire grid of the first optical interferometer is incident on the wire grid of the second optical interferometer, at least a portion of the incident light is reflected. Then, the reflected light is returned to the first optical interferometer as the object light. The light returned from the second optical interferometer to the fist optical interferometer and the reference light reflected by the wire grid of the first optical interferometer interfere with each other in the interference fringe sensor, so that the interference fringe can be acquired. Similarly, in the second optical interferometer, the reference light reflected by the wired grid of the second optical interferometer and the light returned from the first optical interferometer interfere with each other in the interference fringe sensor, so that the interference fringe can be obtained.

According to the aspect of the invention, since the polarization axis directions of the wire grids of the first and second optical interferometers are not parallel to each other, when no workpiece is set, at least a portion of the light transmitted through the wire grid of one of the two optical interferometers is reflected by the wire grid of the other optical interferometer.

Accordingly, when no workpiece is set, both of the first optical interferometer and the second optical interferometer can acquire the interference fringes of the reflected light from the two wire grids in a similar manner.

Thus, since the same interference fringes can be acquired by the first and second optical interferometers, the data acquired by the first and second optical interferometers can be matched by matching coaxial points of the data.

In addition, since the interference fringes generated by interference between the reflected light from the wire grids of the first and second optical interferometers, difference in irregularity between the reference surfaces of the first and second optical interferometers can be obtained. Hence, by subtracting the difference in irregularity between the two reference surfaces after combining the workpiece front surface data and the workpiece rear surface data, change in thickness of the workpiece can be highly accurately obtained.

In the optical interferometer according to the aspect of the invention, the polarization separator of the first optical interferometer and the polarization separator of the second optical interferometer may be disposed such that the polarization axes thereof are orthogonal to each other.

In the arrangement, a state in which no workpiece is set will be described.

Light of a polarized component that is parallel to the polarization axis out of the light incident on the polarization separator from the light emitting section is transmitted and light of a polarized component that is orthogonal to the polarization axis is reflected.

When no workpiece is set, the light having transmitted through the polarization separator of the first optical interferometer is incident on the polarization separator of the second optical interferometer. Then, since the directions of the polarization axes of the polarization separators of the first and second optical interferometers are orthogonal to each other, all the light having transmitted through the first optical interferometer is reflected by the polarization separator of the second optical interferometer. Thus, the interference fringes generated by interference between the reflected light respectively from the polarization separators of the first and second optical interferometers can be obtained.

According to the aspect of the invention, since the polarization axis directions of the polarization separators of the first and second optical interferometers are orthogonal to each other, when no workpiece is set, all of the light having transmitted through the polarization separator of one of the optical interferometers can be reflected by the polarization separator of the other optical interferometer. Hence, when no workpiece is set, light usage efficiency can be good and a clearer interference fringe can be obtained.

In the optical interferometer according to the aspect of the invention, the light emitting section of the first optical interferometer and the light emitting section of the second optical interferometer may include: a common light source; and a light guiding section that divides light from the common light source and respectively guides the divided light to optical paths of the first optical interferometer and the second optical interferometer.

According to the aspect of the invention, the first optical interferometer and the second optical interferometer use light from a common light source, so that the first and second optical interferometers can use light of a common wavelength. By using the light of the common wavelength, same interference fringes can be acquired by the first optical interferometer and the second optical interferometer when no workpiece is set. Hence, by matching corresponding points of the same interference fringes of the first optical interferometer and the second optical interferometer, coaxial points of the data of the first optical interferometer and the second optical interferometer can be accurately matched with each other.

Note that the polarization separator may be a quarter wavelength plate, for example. It is because the polarization separator needs to have a function for generating the reference light by reflecting the light from the light source, a function for setting the polarization directions of the reference light and the object light so as to be orthogonal to each other and a function for returning the light having reached from the optical interferometer on the opposite side with the workpiece interposed to return the light along a common path to the incident path. With these functions, when no workpiece is set, the reference surface of the polarization separator of the first optical interferometer reflects the light from the second optical interferometer to generate the object light; and the reference surface of the polarization separator of the second optical interferometer reflects the light from the first optical interferometer to generate the object light.

DETAILED DESCRIPTION OF PREFERRED EMBODIMENT(S)

An embodiment of the present invention are illustrated in the attached drawings and will be described below with reference to reference numerals given to components in the figures.

Figure 1:
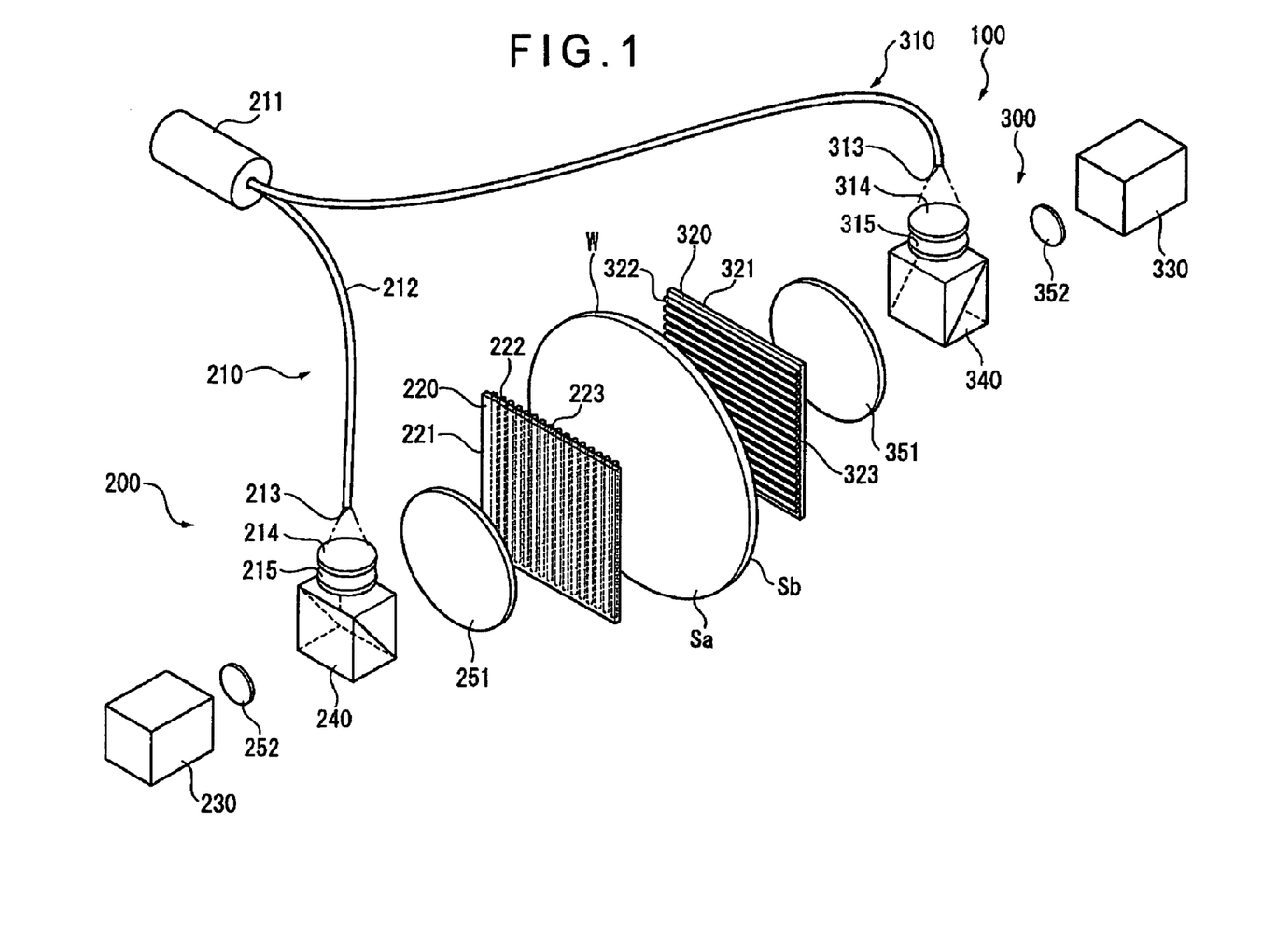
FIG. 1 is a perspective view showing an arrangement of an optical interferometer according to a first embodiment of the present invention.
Figure 2:
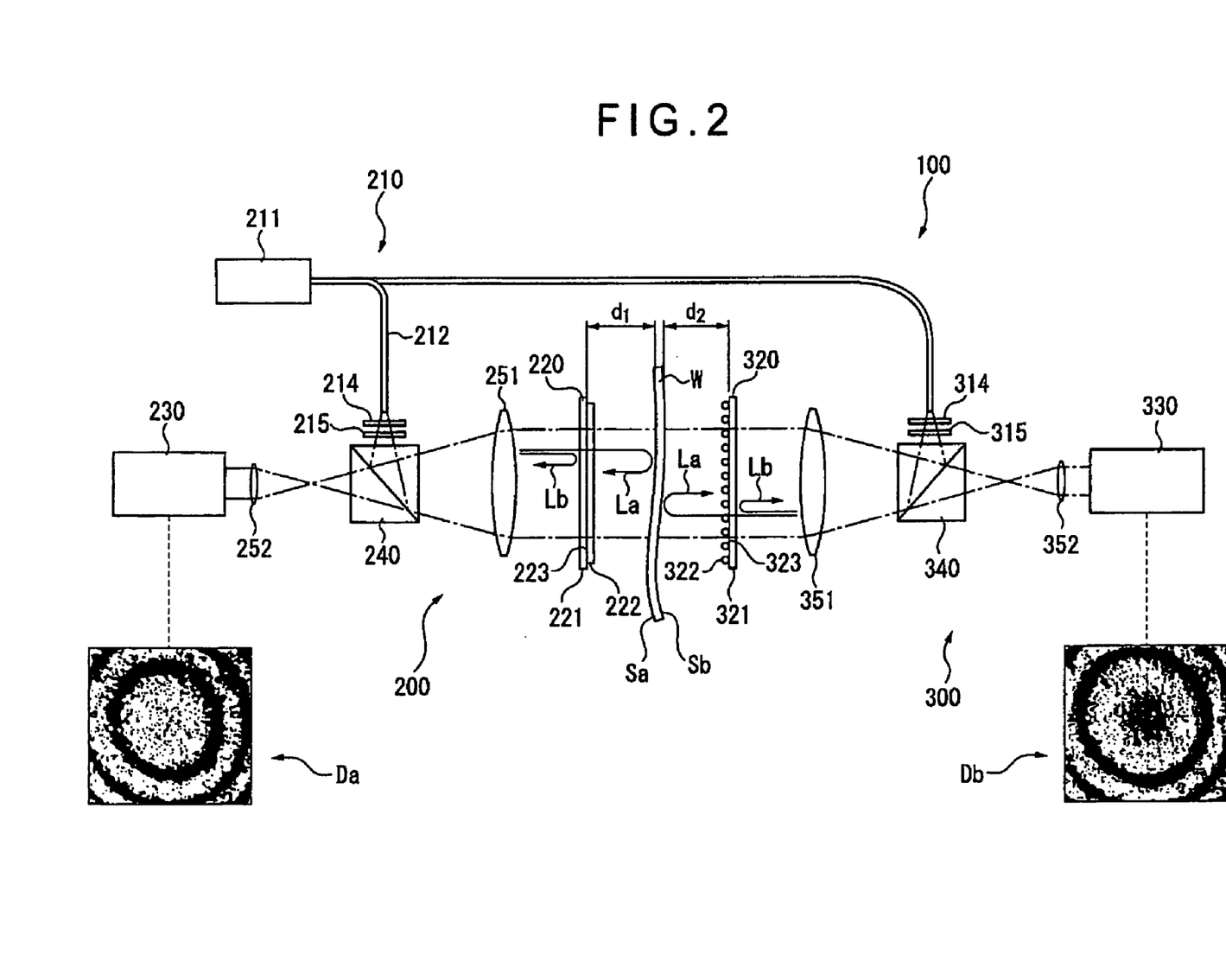
FIG. 2 is a side elevational view of the optical interferometer showing a measurement in a measurement mode of the first embodiment.
Figure 3:
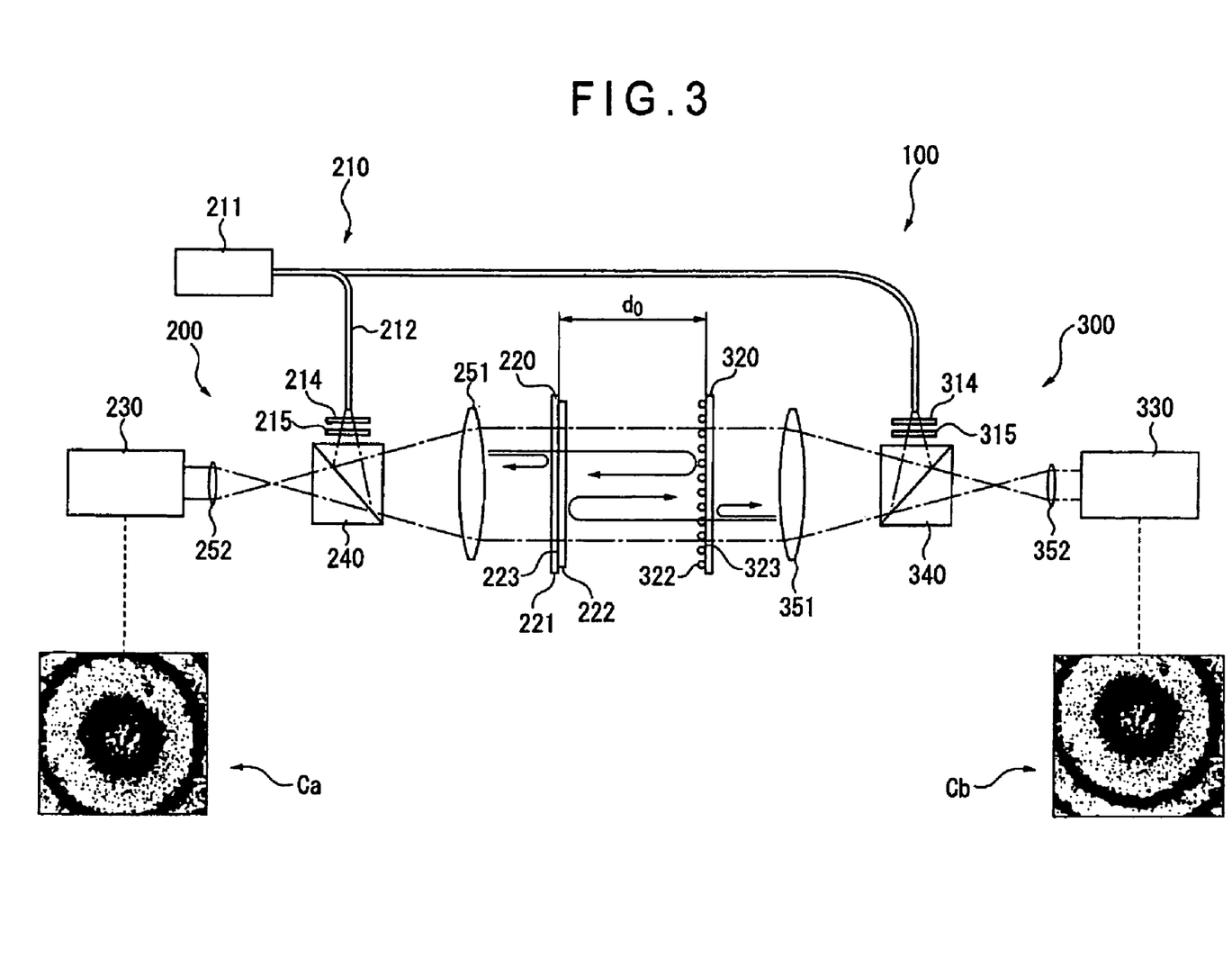
FIG. 3 is a side elevational view of the optical interferometer showing a measurement in a calibration mode of the first embodiment.

FIG. 1 is a perspective view showing an arrangement of an optical interferometer according to a first embodiment of the invention. FIGS. 2 and 3 each are a side elevational view of the optical interferometer.

The optical interferometer 100 includes a first optical interferometer 200 disposed on a front surface Sa side of a workpiece W and a second optical interferometer 300 disposed on a rear surface Sb side of the workpiece W. The first optical interferometer 200 and the second optical interferometer 300 generally have a common arrangement and are symmetric with each other with the workpiece W interposed.

The first optical interferometer 200 includes a light emitting section 210, a polarization separator 220 that has a reference surface 223 and a polarization separating feature, an interference fringe sensor 230 that acquires an interference fringe and a beam splitter 240 that reflects light from the light emitting section 210 toward the polarization separator 220 and transmits light from a polarization separator side toward the interference fringe sensor 230.

The light emitting section 210 includes a light source 211 that emits laser light, an optical fiber 212 that guides light, a polarizer 214 and a half wavelength plate 215. The light emitted from the laser light source 211 is guided by the optical fiber 212 to be incident on the beam splitter 240.

Between an opening end 213 of the optical fiber 212 and the beam splitter 240, the polarizer 214 and the half wavelength plate 215 are disposed. By the polarizer 214 and the half wavelength plate 215, a light beam having a polarization angle of 45 degrees is incident on the beam splitter 240.

The polarization separator 220 includes a wire grid 220.

The wire grid 220 includes a light transmissive plate 221 and a plurality of wires 222 that is disposed on a surface of the light transmissive plate 221 so as to be in parallel to each other. A width of the wires 222 may be about 60 nm, for example. A distance between two wires may be about 140 nm, for example. Out of the light incident on the wire grid 220, a component parallel to the wires 222 is reflected by the wire grid 220, while a component orthogonal to the wires 222 is transmitted through the wire grid 220.

Hereinafter, the wire gird provided on the first optical interferometer 200 is called a first wire grid 220. In the first wire grid 220, the wires 222 are disposed in a vertical direction. Polarized light reflected by the first wire grid 220 is defined as an S wave, while polarized light transmitted through the first wire grid 220 is defined as a P wave.

The first wire grid 220 reflects light, and a reflective surface of the first wire grid 220 serves as a reference surface 223.

The interference fringe sensor 230 may include a polarizer (not shown) having a polarization angle of 45 degrees and a CCD camera (not shown), for example.

Collimator lens 251, 252 are respectively disposed between the beam splitter 240 and the first wire grid 220 and between the beam splitter 240 and the interference fringe sensor 230.

The second optical interferometer 300 generally has a common arrangement to the first optical interferometer 200.

Where the second optical interferometer 300 includes a wire grid, the wire grid of the second optical interferometer 300 is called a second wire grid 320.

Wires 322 of the second wire grid 320 are disposed in a horizontal direction. When seen in the optical axis direction, the direction in which the wires 322 of the second wire grid 320 are disposed is orthogonal to the direction in which the wires 222 of the first wire grid 220 are disposed.

The second optical interferometer 300 and the first optical interferometer 200 use light from one laser light source 211 by diving the light by the optical fiber 212.

Since the second optical interferometer 300 and the first optical interferometer 200 include corresponding components, components of the second optical interferometer 300 are given with reference numerals of which hundred place digit is three and description of the components will be omitted.

An optical path in the optical interferometer having the above-stated arrangement will be described.

The optical interferometer 100 is used in a measurement mode for measuring the workpiece W and a calibration mode for calibrating the optical interferometer 100.

By using FIG. 2, the measuring mode in a case where the workpiece W is set will be described. Note that the first optical interferometer 200 and the second optical interferometer 300 generally have a common arrangement of the optical path, so that the first optical interferometer 200 will be taken as an example in the description below.

Light emitted from the laser light source 211 travels through the optical fiber 212 and is emitted from the opening end 213 of the optical fiber 212. The light emitted from the optical fiber 212 is transmitted through the polarizer 214 to be linear polarized light and transmitted through the half wave-length plate 215 to be a light beam having a polarization angle of 45 degrees. The light transmitted through the half wave-length plate 215 is reflected by the beam splitter 240 onto the workpiece front surface Sa. The light reflected by the beam splitter 240 becomes a parallel light beam by the collimator lens 251 and is incident on the first wire grid 220. Out of the light incident on the first wire grid 220, a component orthogonal to the wires 222 of the first wire grid 220 is transmitted through the first wire grid 220. The light transmitted through the first wire grid 220 is the P wave. The light transmitted through the first wire grid 220 is irradiated on a surface of the workpiece W and reflected by the surface of the workpiece W to be the object light La, the object light La returning to the first wire grid 220 and being transmitted through the first wire grid 220.

On the other hand, out of the light that travels from the collimator lens 251 to be incident on the first wire grid 220, a component parallel to the wires 222 of the first wire grid 220 is reflected by the first wire grid 220. The light reflected by the first wire grid 220 is the S wave. The S wave is reflected by the first wire grid 220 to be the reference light Lb.

The object light (the P wave) La that is the reflected light from the workpiece front surface Sa and the reference light (the S wave) Lb that is reflected light from the first wire grid 220 are combined without interfering with each other, since the polarization directions of the object light La and the reference light Lb are orthogonal to each other. The combined light is transmitted through the collimator lens 251 as a no-interference light beam to be incident on the beam splitter 240. The light incident on the beam splitter 240 is transmitted through the beam splitter 240 and the collimator lens 252 to be incident on the interference fringe sensor 230. Then, the interference fringe sensor 230 acquires an interference fringe generated by interference of the no-interference light beam of the P wave and the S wave.

For example, the no-interference light beam is interfered by the polarizer having a polarization angle of 45 degrees (not shown) and a thus-generated interference fringe is captured by a CCD camera (not shown).

Note that the optical path of the second optical interferometer 300 generally has a common arrangement to that of the first optical interferometer 200. However, the second wire grid 320 reflects the P wave and transmits the S wave. Accordingly, in the second optical interferometer 300, the object light La reflected by the workpiece W is the S wave, and the reference light Lb reflected by the second wire grid 320 is the P wave.

The first optical interferometer 200 acquires an interference fringe representing a profile of the workpiece front surface Sa. The second optical interferometer 300 acquires an interference fringe representing a profile of the workpiece rear surface Sb. The interference fringe representing the profile of the workpiece front surface Sa is the workpiece front surface data Da. The interference fringe representing the profile of the workpiece rear surface Sb is the workpiece rear surface data Db. The workpiece front surface data Da and the workpiece rear surface data Db are stored in a predetermined memory.

The interference fringe of the workpiece front surface data Da is generated by difference in profile between the workpiece front surface Sa and the reference surface 223 of the first wire grid 220. In other words, the interference fringe represents a gap (d1) between the workpiece front surface Sa and the reference surface 223 of the first wire grid 220.

Similarly, the interference fringe of the workpiece rear surface data Db is generated by difference in profile between the workpiece rear surface Sb and the second wire grid 320. In other words, the interference fringe herein represents a gap (d2) between the workpiece rear surface Sb and the reference surface 323 of the second wire grid 320.

Next, the calibration mode for calibrating the optical interferometer will be described.

As shown in FIG. 3, the calibration mode is executed with the workpiece removed. The optical path in this mode is generally common to that of the measurement mode. However, in the first optical interferometer 200, the P wave transmitted through the first wire grid 220 is incident on the second wire grid 320. Since the second wire grid 320 reflects the P wave, the P wave transmitted through the first wire grid 220 is reflected by the second wire grid 320. The S wave reflected by the first wire grid 220 and the P wave reflected by the second wire grid 320 are incident on the interference fringe sensor 230 of the first optical interferometer 200. Then, the interference fringe sensor 230 of the first optical interferometer 200 acquires an interference fringe.

In the second optical interferometer 300, the S wave transmitted through the second wire grid 320 is incident on the first wire grid 220. Since the first wire grid 220 reflects the S wave, the S wave transmitted through the second wire grid 320 is reflected by the first wire grid 220. The P wave reflected by the second wire grid 320 and the S wave reflected by the first wire grid 220 are incident on the interference fringe sensor 330 of the second optical interferometer 300. Then, the interference fringe sensor 330 of the second optical interferometer 300 acquires an interference fringe.

Note that the interference fringe acquired by the first optical interferometer 200 is a fringe generated by interference between the S wave reflected by the first wire grid 220 and the P wave reflected by the second wire grid 320. Hence, when the S wave reflected by the first wire grid 220 is considered as the reference light and the P wave reflected by the second wire grid 320 is considered as the object light, the interference fringe acquired by the interference fringe sensor 230 of the first optical interferometer 200 is generated by difference in profile between the first wire grid 220 and the second wire grid 320. In other words, the interference fringe reflects change in gap (d0) between the first wire grid 220 and the second wire grid 320.

The interference fringe acquired by the second optical interferometer 300 is a fringe generated by interference between the P wave reflected by the second wire grid 320 and the S wave reflected by the first wire grid 220. Hence, when the P wave reflected by the second wire grid 320 is considered as the reference light and the S wave reflected by the first wire grid 220 is considered as the object light, the interference fringe acquired by the interference fringe sensor 330 of the second optical interferometer 300 is generated by difference in profile between the second wire grid 320 and the first wire grid 220. In other words, the interference fringe reflects change in gap (d0) between the second wire grid 320 and the first wire grid 220.

Thus, in the calibration mode, both of the interference fringes acquired by the interference fringe sensor 230 and the interference fringe sensor 330 represent the gap (g0) between the first wire grid 220 and the second wire grid 320, so that the interference fringes are the same.

FIG. 3 shows examples of the interference fringes captured by the first optical interferometer 200 and the second optical interferometer 300. Although profiles of an interference fringe Ca acquired by the first optical interferometer 200 and an interference fringe Cb acquired by the second optical interferometer 300 have a common pattern, positions on capturing screens of the interference fringes may be displaced from each other. This displacement may be caused by that mounting positions of the interference fringe sensors 230 and 330 are displaced from each other.

In this case, corresponding points of the interference fringes are matched with each other. Specifically, a measuring point of the first optical interferometer 200 is matched with a corresponding coaxial measuring point of the second optical interferometer 300. For example, the capturing screens are matched by identifying corresponding pixels and the corresponding relationship is stored in a predetermined memory.

Where the interference fringes captured by the first optical interferometer 200 and the second optical interferometer 300 represent the gap (d0) between the first wire grid 220 and the second wire grid 320, the interference fringes are stored in a predetermined memory as an interference fringe for calibration.

Next, a calculation for obtaining change in thickness of the workpiece will be described.

In the calibration mode, two same interference fringes based on change in gap between the first wire grid 220 and the second wire grid 320 have been acquired by the first optical interferometer 200 and the second optical interferometer 300, and the capturing screens are matched in pixels. Thereby, the two pieces of data of the interference fringes respectively acquired by the first optical interferometer 200 and the second optical interferometer 300 are matched with each other by identifying coaxially corresponding points. In addition, the gap (d0) change between the first wire grid 220 and the second wire grid 320 are calculated using the interference fringes.

Next, the workpiece W is set in the measurement mode. The workpiece front surface data Da and the workpiece rear surface data Db are respectively acquired by the first optical interferometer 200 and the second optical interferometer 300.

Herein the workpiece front surface data Da represents the gap (d1) between the first wire grid 220 and the workpiece front surface Sa.

The workpiece rear surface data Db represents the gap (d2) between the second wire grid 320 and the workpiece rear surface Sb. Then, when combining the workpiece front surface data Da and the workpiece rear surface data Db to calculate change in thickness of the workpiece W, it is necessary to consider that the workpiece front surface data Da and the workpiece rear surface data Db respectively include profiles of the first wire grid 220 and the second wire grid 320 in addition to the profiles of the workpiece front surface and the workpiece rear surface. Accordingly, a following equation represents change in distance (change in thickness) between coaxial points on profiles of the workpiece front surface Sa and the workpiece rear surfaces Sb.

$$TV = d0 - (d1 + d2) \quad \text{(Equation 1)}$$

The calculated change in thickness is output into a predetermined output section such as a monitor and a printer.

The first embodiment including the above-described arrangement provides following advantages.

(1) In the calibration mode in which the workpiece W is not set, since the interference fringes acquired by the first optical interferometer 200 and the second optical interferometer 300 are the same, coaxial points on the data can be matched by matching corresponding points on the data acquired by the first optical interferometer 200 and the second optical interferometer 300. Change in thickness of the workpiece W can be obtained by combining the workpiece front surface data Da and the workpiece rear surface data Db in consideration of the already obtained coaxially corresponding points. In other words, after matching coaxially corresponding points in the calibration mode, change in thickness of the workpiece W can be accurately obtained by combining the workpiece front surface data Da and the workpiece rear surface data Db which are acquired in the measurement mode.

(2) In the calibration mode in which the workpiece W is not set, an interference fringe can be obtained, the interference fringe generated by interference between the reflected light reflected by the reference surface 223 of the first optical interferometer 200 and the reflected light reflected by the reference surface 323 of the second optical interferometer 300. Accordingly, difference in irregularity of the two reference surfaces 223, 323 can be obtained by the interference fringe acquired in the calibration mode. Hence, by subtracting difference in irregularity between the two reference surfaces 223, 323 after combining the workpiece front surface data Da and the workpiece rear surface data Db, change in thickness of the workpiece W can be highly accurately obtained. Change in thickness of the workpiece W can be highly accurately obtained without regard to difference in irregularities between the reference surface 223 of the first optical interferometer 200 and the reference surface 323 of the second optical interferometer 300.

(3) Since the polarization axial direction of the wire grid 220 of the first optical interferometer 200 is orthogonal to the polarization axial direction of the wire grid 320 of the second optical interferometer 300, at least a portion of light transmitted through one of the wire grids 220, 320 of the optical interferometers 200, 300 is reflected by the other of the wire grids 220, 320 of the optical interferometers 200, 300 in the calibration mode. Accordingly, when the workpiece W is not set, both of the first optical interferometer 200 and the second optical interferometer 300 can acquire an interference fringe of the reflected light from the two wire grids in a similar manner.

(4) In the first optical interferometer 200 and the second optical interferometer 300, since both of the interferometers 200, 300 use common light from the common light source 211, the interferometers 200, 300 can use light of common wavelength. By using light of common wavelength, same interference fringes can be acquired by the first optical interferometer 200 and the second optical interferometer 300 in the calibration mode. Hence, by matching corresponding points of the same interference fringes of the first optical interferometer 200 and the second optical interferometer 300, coaxial points of the data of the first optical interferometer 200 and the second optical interferometer 300 can be accurately matched with each other.

First Modification

In the first embodiment, the interference fringe sensor is provided with the polarizer for causing interference between the P wave and the S wave and the CCD camera for capturing the interference fringe. However, the interference fringe sensor may be a phase shift interference fringe sensor that simultaneously acquires phase interference fringes different from each other may be provided.

Figure 4:
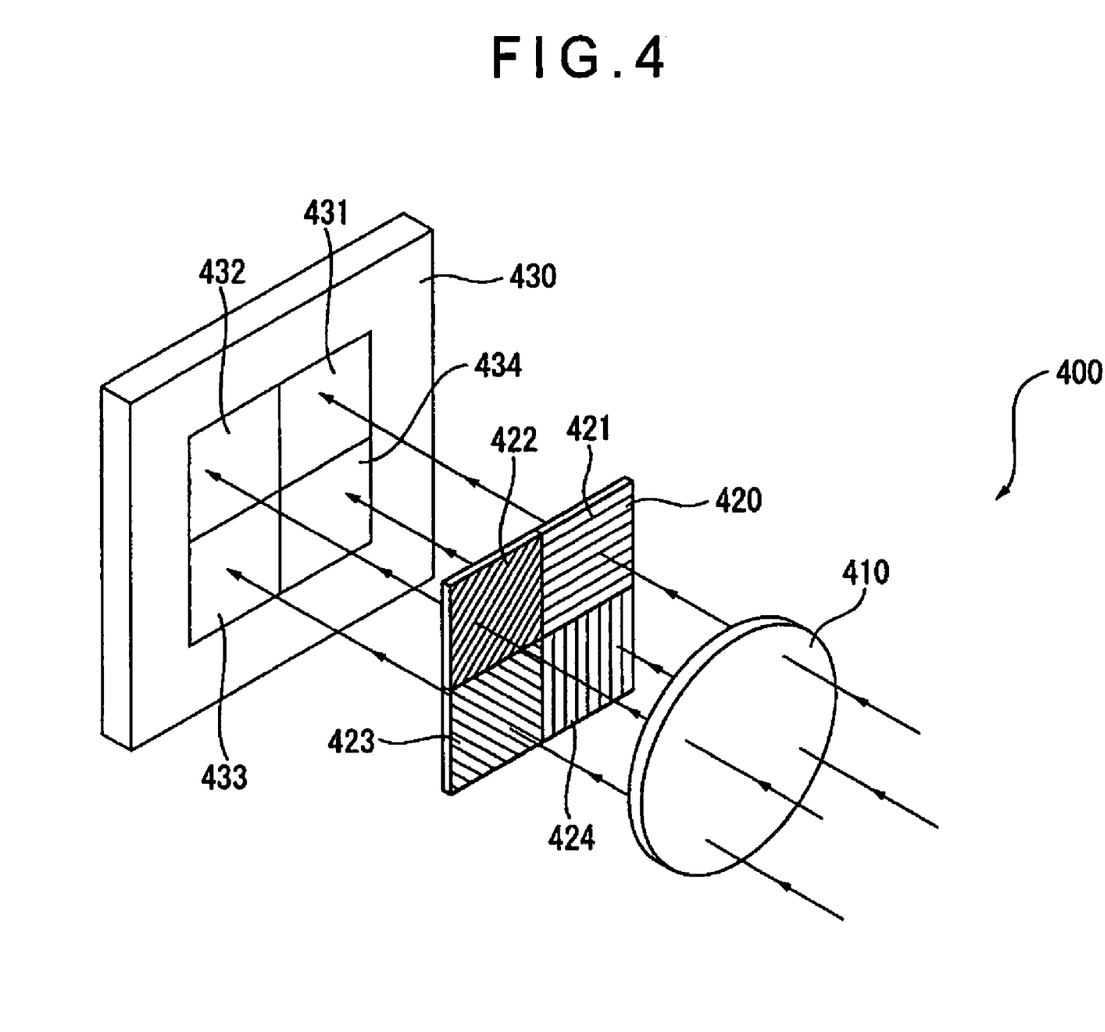
FIG. 4 shows an arrangement of an interference fringe sensor according to a first modification of the invention.

As the phase shift interference fringe sensor, an arrangement shown in FIG. 4 can be exemplified.

In FIG. 4, a phase shift interference fringe sensor 400 includes a quarter wavelength plate 410, a complex polarizer 420 and a complex CCD camera 430 as a capturing section.

The quarter-wavelength plate 410 changes the reference light of the S wave that is incident on the phase shift interference fringe sensor into circular polarized light. The quarter wavelength plate 410 also changes the object light of the P wave that is incident on the phase shift interference fringe sensor into circular polarized light having a different rotation direction from that of the circular polarized light of the reference light.

The complex polarizer 420 is a polarizer that is formed by four polarizers 421 to 424 each having a unique transmission axis angle. By disposing the complex polarizer 420 on the optical path, four portions forming a light beam are respectively emitted through the four polarizers 421 to 424 of the complex polarizer 420, the polarizers 421 to 424 having different transmission axis angles.

The transmission axis angles of the four polarizers 421 to 424 forming the complex polarizer 420 are different from each other by 45 degrees. Namely, the transmission axis angles of the polarizers 421 to 424 respectively are 0, 45, 90 and 135 degrees. The complex CCD camera 430 is formed by four CCD cameras 431 to 434 in correspondence with the polarizers 421 to 424 of the complex polarizer 420.

By taking the first optical interferometer 200 as an example, the optical path at which end the complex CCD camera 431 captures the reference light that is the S wave and the object light that is the P wave will be described.

The light (the S wave, the P wave) transmitted through the beam splitter 240 is divided into four parallel light beams by, for example, a light branching section (not shown) to be incident on the quarter wavelength plate 410. Accordingly, by being transmitted through the quarter wavelength plate 410, the object light of the P wave and the reference light of the S wave respectively become circular polarized light each having a rotation direction opposite to each other. The no-interference light beams of the circular polarized light having the opposite rotation directions are incident on the complex polarizer 420 such that the four portions of the no-interference light beam are respectively transmitted through the polarizers 421 to 424 of the complex polarizer 420.

Figure 5:
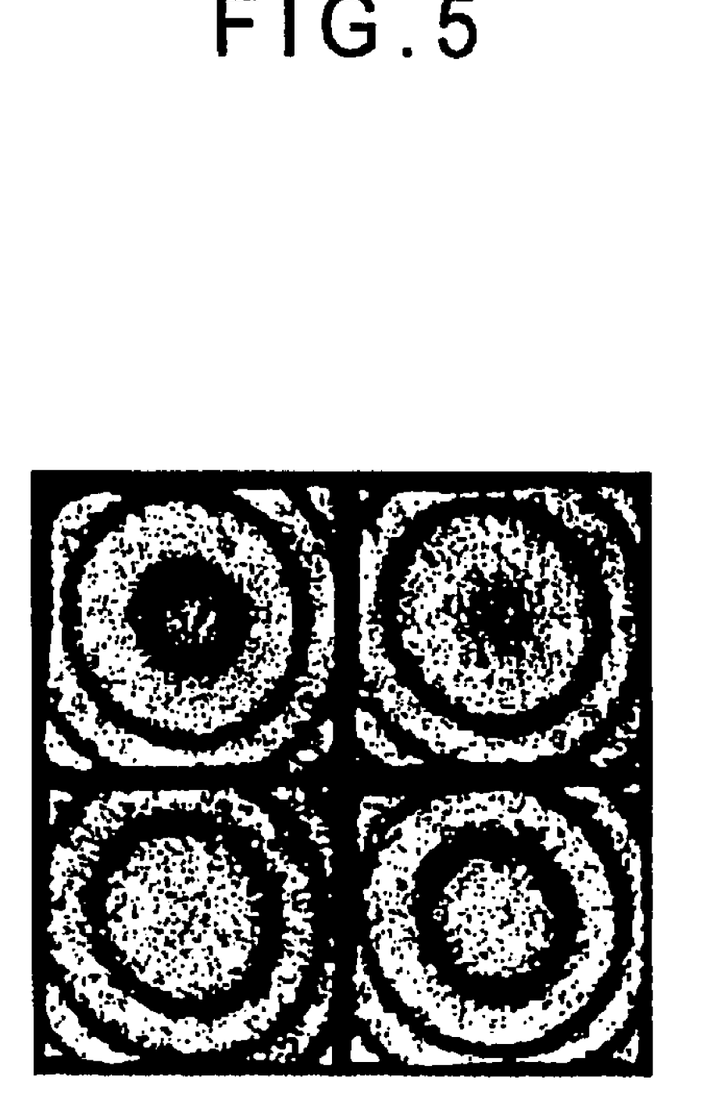
FIG. 5 shows an example of a phase shift interference fringe acquired by the interference fringe sensor of the first modification.

The no-interference light beam is transmitted through the polarizers 421 to 424, so that the reference light Lb and the object light La both contained in the no-interference light beam interfere with each other, generating interference fringes. Where the transmission axis angles of the polarizers 421 to 424 forming the complex polarizer 420 are different from each other by 45 degrees, four interference fringes having phases different from each other by 90 degrees are generated. Images of the interference fringes are incident on the CCD camera 430 and respectively captured by the cameras 431 to 434 of the complex CCD camera 430. As a result, as shown in FIG. 5, the light beam is divided into the four portions and interference fringes having different phases can be respectively acquired from the four portions.

The interference fringes that have phases different from each other by 90 degrees are thus acquired, and the interference fringes can be acquired in the calibration mode and the measurement mode, so that the change in thickness of the workpiece can be obtained.

Second Modification

Figure 6:
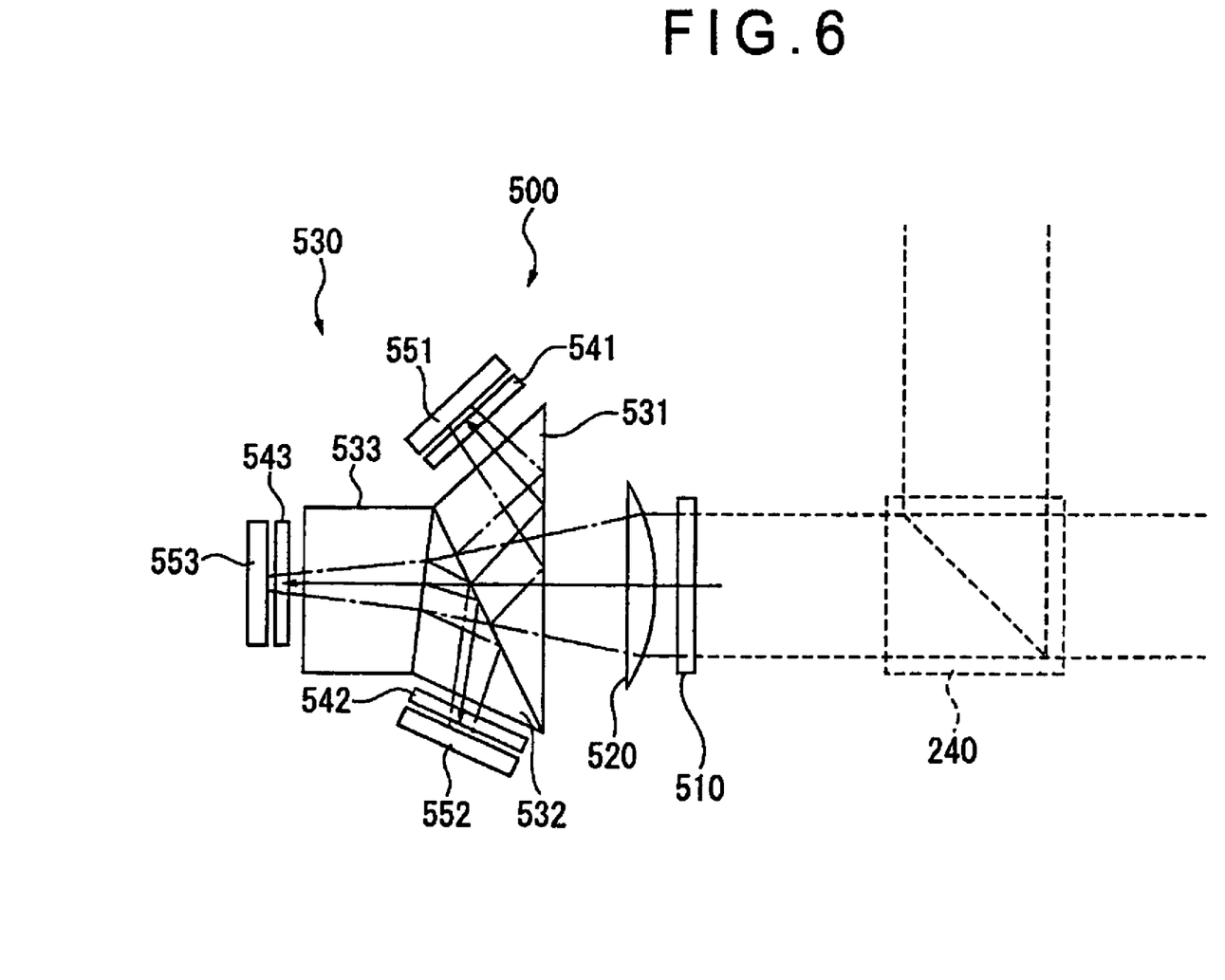
FIG. 6 shows an arrangement of an interference fringe sensor according to a second modification of the invention.

As the phase shift interference fringe sensor, an arrangement shown in FIG. 6 may be alternatively employed.

In FIG. 6, a phase shift interference fringe sensor 500 includes a quarter wavelength plate 510, an imaging lens 520, a no-interference light beam dividing prism 530, a first, second and third polarized plate 541, 542 and 543 and a first, second and third CCD camera 551, 552 and 553.

The no-interference light beam dividing prism 530 includes a first triangle prism 531, a second triangle prism 532 and a trapezoid prism 533 which are adhered to each other. The no-interference light beam dividing prism 530 divides no-interference light into three light beams.

Surfaces on which the prisms 531 to 533 are adhered to each other are semi-transmissive.

The first to third polarized plates 541 to 543 are inserted in optical paths of light beams emitted from the no-interference light beam dividing prism 530. Transmission axis angles of the first to third polarizers 541 to 543 are different from each other by 60 degrees. Namely, when the first polarizer 541 has a transmission axis angle of 0 degree, the transmission axis angle of the second polarizer 542 is 60 degrees and the transmission axis angle of the third polarizer 543 is 120 degrees. The first to third light beams generated by the light beam dividing by the no-interference light beam dividing prism 530 are respectively transmitted through the first to third polarizers 541 to 543, so that the object light La and the reference light Lb of each light beam interfere with each other at the different phases. Thereby, interference fringes having different phases are generated.

The first to third CCD cameras 551 to 553 are disposed at positions for respectively capturing the interference fringes transmitted through the polarizers 541 to 543.

The interference fringes that have phases different from each other by 60 degrees are thus acquired by the interference fringe sensor 500, and the interference fringes can be acquired in the calibration mode and the measurement mode, so that the change in thickness of the workpiece can be obtained.

Third Modification

Figure 7:
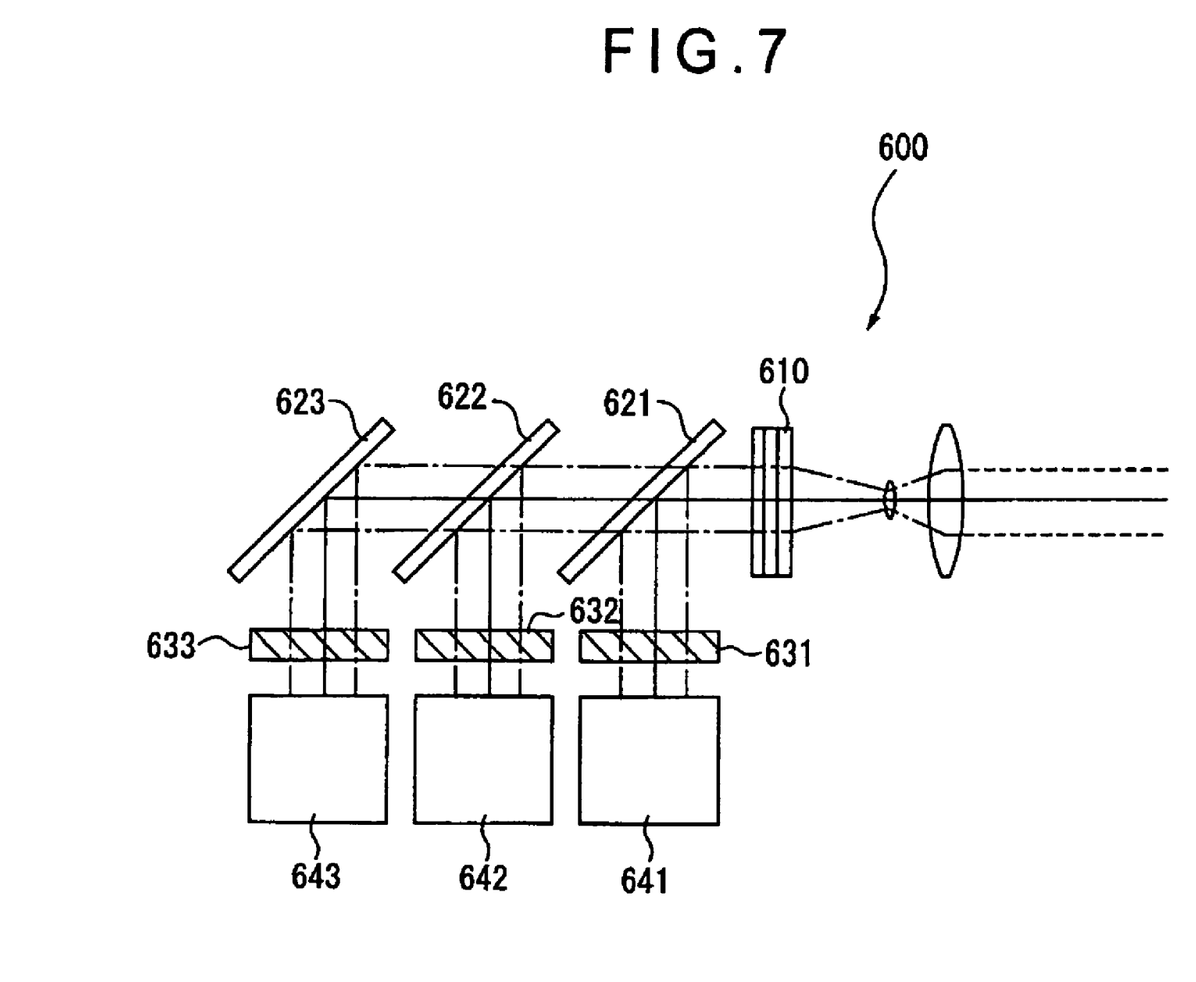
FIG. 7 shows an arrangement of an interference fringe sensor according to a third modification of the invention.

As the phase shift interference fringe sensor, an arrangement shown in FIG. 7 may be alternatively employed.

In FIG. 7, a phase shift interference fringe sensor 600 includes a quarter wavelength plate 610, half mirrors 621, 622 each dividing a light beam into three, a reflection mirror 623, polarizers 631 to 633 disposed in optical paths and CCD cameras 641 to 643.

The reference light Lb and the object light La having polarization directions orthogonal to each other are transmitted through the quarter wavelength plate 610 as a no-interference light beam. The no-interference light beam is transmitted through the quarter wavelength plate 610, so that the object light La and the reference light Lb in the no-interference light beam which have vibration directions orthogonal to each other becomes circular polarized light having rotation directions opposite to each other.

The light transmitted through the quarter wavelength plate 610 is divided into three light beams by the first half mirror 621, the second half mirror 622 and the reflection mirror 623 all of which are disposed on the optical paths. On the optical paths of the divided light beams, the polarizers 631, 632, 633 and the CCD cameras 641 642, 643 are disposed.

Note that transmission axis angles of the first, second and third polarizers 631 to 633 are different from each other, the first polarizer 631 disposed on an optical path of a first light beam reflected by the first half mirror 621, the second polarizer 632 being disposed on an optical path of a second light beam reflected by the second half mirror 622, the third polarizer 633 being disposed on an optical path of a third light beam reflected by the reflection mirror 623.

For example, when a transmission axis angle of the first polarizer 631 is 0 degree, the transmission axis of the second polarizer 632 is 45 degrees and the transmission axis angle of the third polarizer 633 is 90 degrees. Accordingly, the CCD cameras 641 to 643 capture three images of interference fringes having phases different from each other by 90 degrees. The images of the interference fringes are input in a predetermined analyzer such that the three interference fringes are compared with each other in terms of image intensity at points on the interference fringes, thereby obtaining phase information of the workpiece surface. Thereby, the profile of the surface of the workpiece can be obtained.

The interference fringes that have phases different from each other by 90 degrees are thus acquired, the interference fringes can be acquired in the calibration mode and the measurement mode, so that the change in thickness of the workpiece can be obtained.

Note that the scope of the present invention is not limited to the above-described exemplary embodiment, and the scope of the invention also includes modification and improvements as far as an object of the invention can be achieved.

For example, in the above-stated embodiments, the polarization separator is a wire grid type, but the polarization separator may be a quarter wavelength plate. The light emitting sections of the first and second optical interferometers share the same light source in the embodiment, but the first and second optical interferometers may have a dedicated light source. In this case, it is better that the light sources of the first and second optical interferometers have a common wavelength. When the first and second optical interferometers use light having a common wavelength, the first and second optical interferometers can acquire the same interference fringes in the calibration mode.

The priority application Number JP2006-089265 upon which this patent application is based is hereby incorporated by reference.

What is claimed is:

1. An optical interferometer that measures change in thickness of a workpiece, comprising:
   a first optical interferometer disposed on a front surface side of the workpiece; and
   a second optical interferometer disposed on a rear surface side of the workpiece, wherein
   the first optical interferometer and the second optical interferometer each include:
   a light emitting section;
   a polarization separator disposed between the light emitting section and the workpiece, the polarization separator having a reference surface, the polarization separator arranged such that a polarization direction of reference light that is reflected light reflected by the reference surface is orthogonal to a polarization direction of object light that is reflected light reflected by the workpiece; and
   an interference fringe sensor that acquires an interference fringe generated by interference between the reference light and the object light,
   the polarization separator of the first optical interferometer and the polarization separator of the second optical interferometer are disposed such that directions of polarization axes thereof are not in parallel to each other, and
   when the workpiece is not set, the reference surface of the polarization separator of the first optical interferometer reflects light from the second optical interferometer to generate object light; and the reference surface of the polarization separator of the second optical interferometer reflects light from the first optical interferometer to generate object light.

2. The optical interferometer according to claim 1, wherein the polarization separators each are a wire grid polarizer that has a plurality of wires aligned in parallel to each other, the polarization separators reflecting a component that is parallel to the plurality of wires and transmitting a component that is orthogonal to the plurality of wires, and
   a direction in which the plurality of wires are aligned of the wire grid polarizer of the first optical interferometer is not parallel to a direction in which the plurality of wires are aligned of the wire grid polarizer of the second optical interferometer.

3. The optical interferometer according to claim 1, wherein the polarization separator of the first optical interferometer and the polarization separator of the second optical interferometer are disposed such that the polarization axes thereof are orthogonal to each other.

4. The optical interferometer according to claim 2, wherein the polarization separator of the first optical interferometer and the polarization separator of the second optical interferometer are disposed such that the polarization axes thereof are orthogonal to each other.

5. The optical interferometer according to claim 1, wherein the light emitting section of the first optical interferometer and the light emitting section of the second optical interferometer include:
   a common light source; and
   a light guiding section that divides light from the common light source and respectively guides the divided light to optical paths of the first optical interferometer and the second optical interferometer.

6. The optical interferometer according to claim 2, wherein the light emitting section of the first optical interferometer and the light emitting section of the second optical interferometer include:

a common light source; and a light guiding section that divides light from the common light source and respectively guides the divided light to optical paths of the first optical interferometer and the second optical interferometer.

7. The optical interferometer according to claim 3, wherein the light emitting section of the first optical interferometer and the light emitting section of the second optical interferometer include:

a common light source; and a light guiding section that divides light from the common light source and respectively guides the divided light to optical paths of the first optical interferometer and the second optical interferometer.

8. The optical interferometer according to claim 4, wherein the light emitting section of the first optical interferometer and the light emitting section of the second optical interferometer include:

a common light source; and a light guiding section that divides light from the common light source and respectively guides the divided light to optical paths of the first optical interferometer and the second optical interferometer.

* * * * *